United States Patent [19]

Hogsett

[11] Patent Number: 4,726,456

[45] Date of Patent: Feb. 23, 1988

[54] BRAKING SYSTEM FOR A MOLDED FIBERGLASS SPIRAL CHUTE

[75] Inventor: Russell J. Hogsett, Canon City, Colo.

[73] Assignee: Portec, Inc., Oak Brook, Ill.

[21] Appl. No.: 870,505

[22] Filed: Jun. 4, 1986

[51] Int. Cl.⁴ .................... B65G 11/06; B65G 11/16
[52] U.S. Cl. ..................................... 193/12; 193/32
[58] Field of Search ............................ 193/12, 32, 40; 194/344; 198/534

[56] References Cited

U.S. PATENT DOCUMENTS

| | | | |
|---|---|---|---|
| 2,326,504 | 8/1943 | Smith | 193/32 |
| 4,010,842 | 3/1977 | Smith | 198/394 |
| 4,286,702 | 9/1981 | Langen | 193/2 R |

FOREIGN PATENT DOCUMENTS 556609  2/1957  Italy ........................ 193/32

Primary Examiner—Jeffrey V. Nase
Attorney, Agent, or Firm—Klaas & Law

[57] ABSTRACT

Friction applying material in a recess in a portion of the upper surface of a molded fiberglass spiral chute to apply a braking force to reduce the velocity of articles passing over the upper surface of the molded fiberglass spiral chute while still providing a substantially continuous surface for passage of the articles.

18 Claims, 4 Drawing Figures

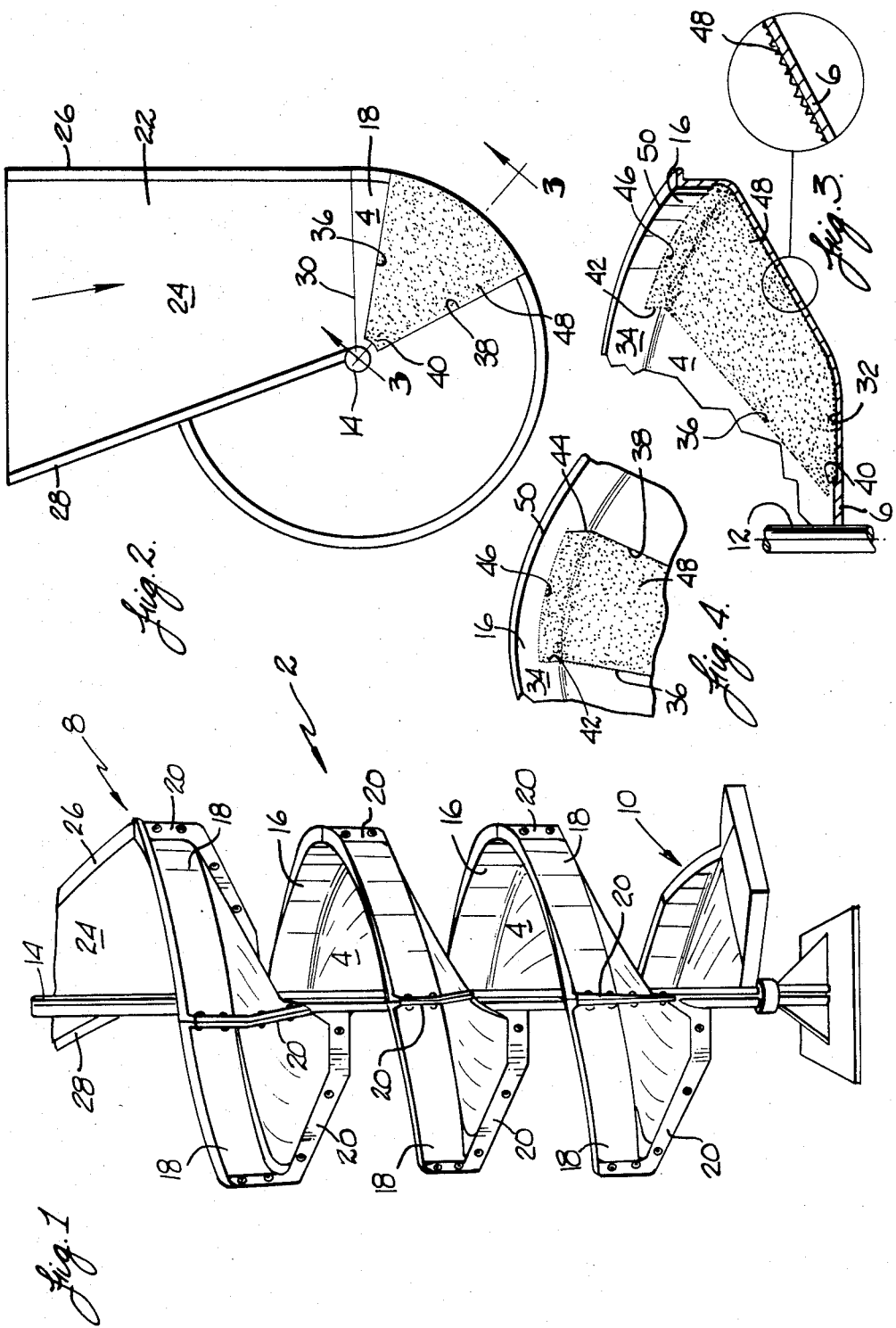

BRAKING SYSTEM FOR A MOLDED FIBERGLASS SPIRAL CHUTE

FIELD OF INVENTION

This inventin relates generally to the transport of articles from an upper location to a lower location over the upper surface of a molded fiberglass spiral chute and more particularly to a braking system for reducing the velocity of articles passing over the upper surface of a molded fiberglass spiral chute.

BACKGROUND OF THE INVENTION

In many instances, it is desirable to transport articles, such as parcels, packages, boxes, crates or other materials, from an upper location to a lower location. A particularly efficient system utilizes a molded fiberglass spiral chute. The upper surface of the molded fiberglass spiral chute is coated with a material so as to provide a low frictional surface thereon so that articles placed thereon will move readily from the upper location to the lower location. In some instances, the coating provides a substantially friction-free surface so that articles placed thereon will have self-starting movement in a direction toward the lower location. This low friction or friction free surface creates a problem when articles moving at relatively high speeds are deposited thereon. Therefore, it has been desirable for some time to have means of some nature to reduce the velocity of articles placed on the molded fiberglass spiral chutes.

BRIEF DESCRIPTION OF THE INVENTION

This invention provides a braking system for a molded fiberglass spiral chute to reduce the velocity of articles deposited thereon and moving thereover wherein a friction applying means is applied to a portion of the upper surface of the molded fiberglass spiral chute.

In one embodiment of the invention, the upper surface of a molded fiberglass spiral chute is coated with a material to provide a surface that is substantially friction-free so that an article placed thereon will have self-starting movement toward a lower location. A recess is formed in the first 90 degree portion of the molded fiberglass spiral chute and this recess is coated with a friction applying means to apply a braking force on articles passing thereover. The coating comprises a mixture of sand and epoxy resin and extends for a distance equal to between about 60 and 80 percent of the radius of the molded fiberglass spiral chute. The outer surface of the friction applying means has a plurality of spaced apart peaks and valleys with the highest peaks being substantially flush with adjacent portions of the upper surface. While the friction applying means are located in the first 90 degrees portion of the molded fiberglass spiral chute of this embodiment, the friction applying means can be located elsewhere particularly if the self-starting feature is not required.

It is an object of this invention to provide a braking system for a molded fiberglass spiral chute used to transport articles from an upper location to a lower location.

Additional objects, advantages, and novel features of the invention are set forth in part in the description which follows which will be understood by those skilled in the art upon examination of the following or may be learned by practive of the invention. The objects and advantages of the invention may be realized and obtained by means of the instrumentalities and combinations particularly pointed out in the appended claims.

BRIEF DESCRIPTION OF THE DRAWING

FIG. 1 is a schematic illustration of a molded fiberglass spiral chute;

FIG. 2 is a top plan view of FIG. 1;

FIG. 3 is a cross-sectional view taken on the line 3—3 of FIG. 2; and

FIG. 4 is a pictorial view illustrating a portion of the braking system.

DETAILED DESCRIPTION OF THE INVENTION

In FIG. 1, there is a schematic illustration of a molded fiberglass spiral chute 2 of a preferred embodiment of the invention. Except for the invention described below, the molded fiberglass spiral chute 2 is of conventional construction such as molded fiberglass spiral chutes marketed by the Flomaster Division of Portec, Inc. under the trade designation Safeglide. The molded fiberglass spiral chute 2 has an upper surface 4 on a load supporting wall 6 over which articles move from an upper location 8 to a lower location 10. Extending vertically from the upper surface 4 is a vertical inner wall 12 formed by the periphery of the pipe 14 on which the molded fiberglass chute is supported and a vertical outer wall 16 integrally molded with the load supporting wall 6. The transition portion between the upper surface 4 and the vertical outer wall 16 is suitably radiused so as to provide a continuous smooth surface. As illustrated in FIG. 1, the molded fiberglass spiral chute 2 is formed by a plurality of spiral sections 18, each of which comprises a spiral turn of 90 degrees of revolution with adjacent spiral sections being secured together by bolted flanges 20. If desired, the spiral sections 18 can extend for 180 degrees, 360 degrees or any desired extent.

The upper surface 4 and the inner surface 34 of the outer wall 16 are provided with a gel coating, not particularly illustrated, that provides for a low friction surface thereon. In the preferred embodiment of the invention, the gel coating provides a surface that is substantially friction free so that an article placed on the surface at a rest position will start to move, solely by the force of gravity, by itself in a direction toward the lower location 10. The upper section 18 is joined to an inlet portion 22 having a central upper surface 24 and vertical end walls 26 and 28 extending upwardly therefrom.

The braking system of this application is illustrated in FIGS. 2-4. The inlet portion 22 is joined to the first spiral section 18 along the line 30 in FIG. 2. A continuous recess 32 is formed in a portion of the upper surface 4 and a portion of the inner surface 34 of the outer wall 16. The portion of the recess 32 in the upper surface has radially extending side wall portions 36 and 38 and an arcuate inner wall portion 40. The portion of the recess 32 in the inner surface 34 of the outer wall 16 has vertically extending side wall portions 42 and 44 which are extensions of the radially extending side wall portion 36 and 38. The recess 32 has an arcuate outer wall portion 46 in the inner surface 34 of the outer wall 16. An abrasive coating 48 is applied to the recess 32 so as to form a friction applying surface. In the preferred embodiment of the invention, the surface of the abrasive coating 48 has a plurality of spaced apart peaks and valleys, with the highest of the peaks being substantially flush with the adjacent portions of the upper surface 4. In some instances, the highest of spaced apart peaks may protrude slightly above the adjacent portions of the upper surface 4.

In the preferred embodiment of the invention, the distance along the outer wall 16 from the line 30 to the vertically extending side wall portion 42 is equal to between about 5 and 15 percent of the radius of the molded fiberglass spiral chute 2 and preferably about 10 percent of such radius. The distance along the outer wall 16 between the vertically extending side wall portions 42 and 44 is equal to between about 60 and 80 percent of the radius of the molded fiberglass spiral chute 2 and preferably is about 70 percent of such radius.

The recess 32 in the upper surface 4 of the load supporting wall 6 may be formed in any suitable manner such as by grinding away a portion of the upper surface 4 and the load supporting wall 6 and a portion of the inner surface 34 and the outer wall 16. In the preferred embodiment of the invention, the recess 32 has a depth of between about 0.055 and 0.065 of an inch and preferably is about 0.062 of an inch. The arcuate inner wall portion 40 is spaced from the vertical inner wall 12 a distance of between about 6 and 10 inches and preferably about 8 inches from the vertical inner wall 12. The arcuate outer wall portion 16 is spaced from the top 50 of the outer wall 16 a distance of between about 4 and 7 inches and preferably about 5 inches.

The abrasive coating 48 may be formed from any suitable materials so as to form a friction applying means capable of applying a frictional force on articles passing thereover so as to reduce the velocity of such articles. In the preferred embodiment of the invention, the abrasive coating 48 comprises a mixture of sand and epoxy resin in a ratio of between about 3.0 to 1.5 parts sand to about 1.0 part of epoxy resin and preferably about 2.4 parts sand to about 1.0 part of epoxy resin. The sand is a medium grit silica sand having particle sizes between about 0.025 and 0.065 of an inch and preferably between about 0.030 and 0.060 of an inch. The epoxy resin is of the type marketed by Ram Chemicals under the trade designation FR GREY GEL COAT. The average distance between the peaks of the abrasive coating 48 is between about 0.100 and 0.150 of an inch and preferably about 0.125 of an inch.

In one embodiment of the invention, the molded fiberglass spiral chute 2 has a radius of about 51 inches and the pipe 14, formed from steel, has a diameter of about 10.75 inches. The outer wall 16 has a height of about 16 inches. The distance along the outer wall 16 from the line 30 to the vertically extending side wall portion 42 is about 5 inches. The distance along the outer wall 16 between the vertically extending side wall portions 42 and 44 is about 36 inches. The arcuate inner wall 40 is spaced from the periphery of the pipe 14 a distance of about 10 inches. The recess 32 has a depth of about 0.062 of an inch. The abrasive coating 48 is a mixture of 2.4 parts of a medium grit silica sand having particle sizes in the range of about 0.030 and 0.060 of an inch to 1.0 part of an epoxy resin marketed by Ram Chemicals under the trade designation FR GREY GEL COAT. The abrasive coating was applied in the recess 32 so as to have spaced apart peaks which are substantially flush with the adjacent portions of the upper surface 4. The average distance between the spaced apart peaks is about 0.125 of an inch.

It is contemplated that the inventive concepts herein described may be variously otherwise embodied and it is intended that the appended claims be construed to include alternative embodiments of the invention except insofar as limited by the prior art.

What is claimed is:

1. A molded fiberglass spiral chute for transporting articles from an upper location to a lower location comprising:
   a molded fiberglass spiral chute extending from an upper location to a lower location;
   said molded fiberglass spiral chute having an upper surface over which articles are adapted to move;
   said molded fiberglass spiral chute having an inner wall extending upwardly from said upper surface and an outer wall extending upwardly from said upper surface with said outer wall having an inner surface;
   a coating on said upper surface of said molded fiberglass spiral chute and said inner surface of said outer wall;
   said coating providing a low frictional surface so that articles placed thereon will move readily in a direction toward said lower location;
   a recess formed in a portion of said upper surface of said molded fiberglass spiral chute and having an upper surface;
   friction applying means on said upper surface of said recess for applying a frictional braking force on articles passing hereover so as to reduce the velocity thereof; and
   said friction applying means having an upper surface which is substantially flush with adjacent portions of said upper surface of said molded fiberglass spiral chute.

2. A molded fiberglass spiral chute as in claim 1 and further comprising:
   said coating providing a substantially friction free surface so that articles placed thereon will have self-starting movement in a direction toward said lower location;
   said recess having radially extending side wall portions and arcuate radially inner and outer wall portions; and
   said recess being located in the first 90 degrees portion of said molded fiberglass spiral chute.

3. A molded fiberglass spiral chute as in claim 1 and further comprising:
   said recess extending into a joining portion of said inner surface of said outer wall;
   said recess in said upper surface having radially extending side wall portions and an arcuate radially inner wall portion;
   said side wall portions continuing in a vertical direction in said inner surface of said outer wall to form an arcuate outer wall recess portion in said portion of said inner surface of said outer wall of said molded fiberglass spiral chute extending between said vertically extending side wall portions; and
   friction applying means on said arcuate recess portion in said inner surface of said outer wall.

4. A molded fiberglass spiral chute as in claim 3 wherein:
   said arcuate outer wall portion of said recess extends for a distance equal to between about 60 and 80 percent of the radius of said molded fiberglass spiral chute.

5. A molded fiberglass spiral chute as in claim 4 wherein:
said friction applying means comprises a mixture of between about 3.0 to 1.5 parts sand to about 1.0 part of epoxy resin.

6. A molded fiberglass spiral chute as in claim 5 wherein:
said recess has a depth of between about 0.055 and 0.065 of an inch; and
said friction applying means has a plurality of spaced apart peaks having a height between about 0.030 and 0.065 of an inch with an average distance between said peaks of between about 0.100 and 0.150 of an inch.

7. A molded fiberglass spiral chute for transporting articles from an upper location to a lower location comprising:
a molded fiberglass spiral chute extending from an upper location to a lower location;
said molded fiberglass spiral chute having an upper surface over which articles are adapted to move;
said molded fiberglass spiral chute having an inner wall extending upwardly from said upper surface and an outer wall extending upwardly from said upper surface and having an inner surface;
a coating on said upper surface of said molded fiberglass spiral chute and said inner surface of said outer wall;
said coating providing a low frictional surface so that articles placed thereon will move readily in a direction toward said lower location;
friction applying means on at least a portion of said upper surface of said molded fiberglass spiral chute for applying a frictional force on articles passing thereover so as to reduce the velocity thereof;
a recess formed in a portion of said upper surface and located in the first 90 degrees portion of said molded fiberglass spiral chute;
said friction applying means being located in said recess;
said friction applying means having an outer surface having spaced apart peaks and valleys; and
the highest peaks of said friction applying means being substantially flush with the adjacent portions of said upper surface of said molded fiberglass spiral chute.

8. A molded fiberglass spiral chute as in claim 7 wherein:
said friction applying means comprises a mixture of epoxy resin and sand.

9. A molded fiberglass spiral chute as in claim 7 wherein:
said recess having radially extending side wall portions and arcuate inner and outer wall portions.

10. A molded fiberglass spiral chute as in claim 9 wherein:
said outer wall portion of said recess extends for a distance equal to between about 60 and 80 percent of the radius of said molded fiberglass spiral chute.

11. A molded fiberglass spiral chute as in claim 10 wherein:
said friction applying means comprises a mixture of between about 3.0 to 1.5 parts sand to about 1.0 part of epoxy resin.

12. A molded fiberglass spiral chute as in claim 11 wherein:
said recess has a depth of between about 0.055 and 0.065 of an inch.

13. A molded fiberglass spiral chute as in claim 12 wherein:
said spaced apart peaks of said friction applying means have a height of between about 0.030 and 0.065 of an inch with an average distance therebetween of between about 0.100 and 0.150 of an inch.

14. A molded fiberglass spiral chute as in claim 13 wherein:
the first part of said friction applying means is located a distance from the beginning of said first 90 degrees portion of said molded fiberglass spiral chute along the outer wall equal to between about 5 and 15 percent of the radius of said molded fiberglass spiral chute.

15. A molded fiberglass spiral chute as in claim 9 wherein:
said arcuate outer wall portion of said recess extends for a distance equal to about 70 percent of the radius of said molded fiberglass spiral chute.

16. A method for applying a braking force on articles passing over an upper surface of a molded fiberglass spiral chute comprising:
providing a molded fiberglass spiral chute having an upper surface over which articles are adapted to move and a vertical inner wall having an outer surface and a vertical outer wall having an inner surface extending upwardly from said upper surface;
mounting one end of said molded fiberglass spiral chute at an upper location and mounting the other end of said molded fiberglass spiral chute at a lower location;
applying a coating on said upper surface and said inner surface of said outer wall so that articles placed on said upper surface at said upper location have self-starting movement in a direction toward said lower location;
forming a recess in a portion of said upper surface of said molded fiberglass spiral chute, said recess having an upper surface; and
applying a friction applying means on said upper surface of said recess to apply a frictional braking force on articles passing thereover so as to reduce the velocity thereof and applying said friction applying means so that said friction applying means has an upper surface which is substantially flush with adjacent portions of said upper surface of said molded fiberglass spiral chute.

17. A method as in claim 16 and further comprising:
extending said recess into a portion of said inner surface of said outer wall so that said portion has an inner surface; and
applying friction applying means in said portion of said recess in said inner surface of said outer wall so that said friction applying means has an inner surface which is substantially flush with adjacent portions of said inner surface of said outer wall of said molded fiberglass spiral chute.

18. A method as in claim 17 and further comprising:
forming said friction applying means from a mixture of between about 3.0 to 1.5 parts sand to about 1.0 part of epoxy resin.

* * * * *